United States Patent
Akiyama et al.

(10) Patent No.: US 12,330,476 B2
(45) Date of Patent: *Jun. 17, 2025

(54) COOLING FAN DEVICE

(71) Applicant: TOYOTA JIDOSHA KABUSHIKI KAISHA, Toyota (JP)

(72) Inventors: Shoichi Akiyama, Toyota (JP); Dai Okumura, Seto (JP); Atsushi Fukuda, Toyota (JP); Makoto Monya, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

This patent is subject to a terminal disclaimer.

(21) Appl. No.: 18/355,413

(22) Filed: Jul. 20, 2023

(65) Prior Publication Data
US 2024/0025230 A1     Jan. 25, 2024

(30) Foreign Application Priority Data
Jul. 22, 2022    (JP) ................................ 2022-117027

(51) Int. Cl.
*F01P 7/10*          (2006.01)
*B60H 1/00*          (2006.01)
(Continued)

(52) U.S. Cl.
CPC ..... *B60H 1/00878* (2013.01); *B60H 1/00821* (2013.01); *B60K 11/02* (2013.01);
(Continued)

(58) Field of Classification Search
CPC ........ B60H 2001/3277; B60H 1/00764; B60K 11/06; B60K 11/02; F02B 29/0431; F02B 29/0456
(Continued)

(56) References Cited

U.S. PATENT DOCUMENTS 4,651,922 A * 3/1987 Noba ..................... F04D 25/166
                                                       236/35
4,823,744 A * 4/1989 Omura .................... F04D 27/00
                                                     123/41.12
(Continued)

FOREIGN PATENT DOCUMENTS

| JP | 2007170236 A | 7/2007 |
| JP | 2021063468 A | 4/2021 |
| JP | 2021173382 A | 11/2021 |

OTHER PUBLICATIONS

Notice of Allowance dated Oct. 4, 2023 issued in the U.S. Appl. No. 18/337,431.

*Primary Examiner* — Logan M Kraft
*Assistant Examiner* — James J Kim

(57) ABSTRACT

A cooling fan device uses a cooling fan coupled to an engine via a fan clutch to generate cooling air flow for a radiator. The cooling fan device includes an electronic control unit configured to control an engagement rate of the fan clutch. The electronic control unit is configured to execute a first calculation process, a second calculation process, and an upper limit guarding process, thereby controlling the engagement rate based on a value of a coolant temperature requested engagement rate that has been subjected to an upper limit guarding process. A first upper limit rotation speed is set to a lower speed when a vehicle speed is relatively low than when the vehicle speed is relatively high.

4 Claims, 2 Drawing Sheets

(51) Int. Cl.
*B60K 11/02*      (2006.01)
*F04D 25/02*      (2006.01)
*F04D 27/00*      (2006.01)

(52) U.S. Cl.
CPC ......... *B60Y 2300/42* (2013.01); *F04D 25/022* (2013.01); *F04D 27/004* (2013.01)

(58) Field of Classification Search
USPC ...................................................... 123/41.49
See application file for complete search history.

(56) References Cited

U.S. PATENT DOCUMENTS

| | | | |
|---|---|---|---|
| 11,434,808 B2* | 9/2022 | Akiyama | ................ B60K 11/02 |
| 11,833,883 B1* | 12/2023 | Akiyama | ............ B60H 1/00828 |
| 2006/0096554 A1* | 5/2006 | Shiozaki | ............... F16D 48/064 |
| | | | 123/41.12 |
| 2019/0241060 A1* | 8/2019 | Hara | ...................... E02F 9/2095 |
| 2021/0332825 A1 | 10/2021 | Akiyama et al. | |

* cited by examiner

COOLING FAN DEVICE

BACKGROUND

1. Field

The present disclosure relates to a cooling fan device.

2. Description of Related Art

Japanese Laid-Open Patent Publication No. 2021-173382 discloses a cooling fan device that generates cooling air flow for a radiator, which cools engine coolant. The disclosed device performs electronic control of a cooling fan.

In the above-described cooling fan device, when the cooling fan is controlled so as to satisfy the cooling request of the engine, the rotation speed of the cooling fan increases, for example, at the time of acceleration of the vehicle. An increase in the rotation speed of the cooling fan increases fan noise. This may degrade drivability.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a cooling fan device is configured to use a cooling fan coupled to an engine via a fan clutch to generate cooling air flow for a radiator. The cooling fan device includes an electronic control unit configured to control an engagement rate of the fan clutch. The electronic control unit is configured to execute: a first calculation process that calculates a coolant temperature requested engagement rate, the coolant temperature requested engagement rate being a requested value of the engagement rate in accordance with a cooling request for the engine coolant; a second calculation process that calculates, as a first guard value, a value of the engagement rate at which a rotation speed of the cooling fan is a first upper limit rotation speed based on a vehicle speed; and an upper limit guarding process that sets a value of the coolant temperature requested engagement rate to the first guard value when a calculated value of the coolant temperature requested engagement rate in the first calculation process exceeds the first guard value, thereby controlling the engagement rate based on a value of the coolant temperature requested engagement rate after being subjected to the upper limit guarding process. The first upper limit rotation speed is set to a lower speed when the vehicle speed is relatively low than when the vehicle speed is relatively high.

The electronic control unit executes the first calculation process, the second calculation process, and the upper limit guarding process, thereby controlling the engagement rate of the fan clutch such that the rotation speed of the cooling fan is less than or equal to the first upper limit rotation speed. The first upper limit rotation speed is set to a lower speed when the vehicle speed is relatively low so that background noise is relatively low than when the vehicle speed is relatively high and the background noise is relatively loud. This allows the fan noise to be controlled to have a magnitude that is less noticeable with respect to the background noise, which changes depending on the vehicle speed. Therefore, the cooling fan device prevents drivability from deteriorating due to fan noise.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Figure 1:
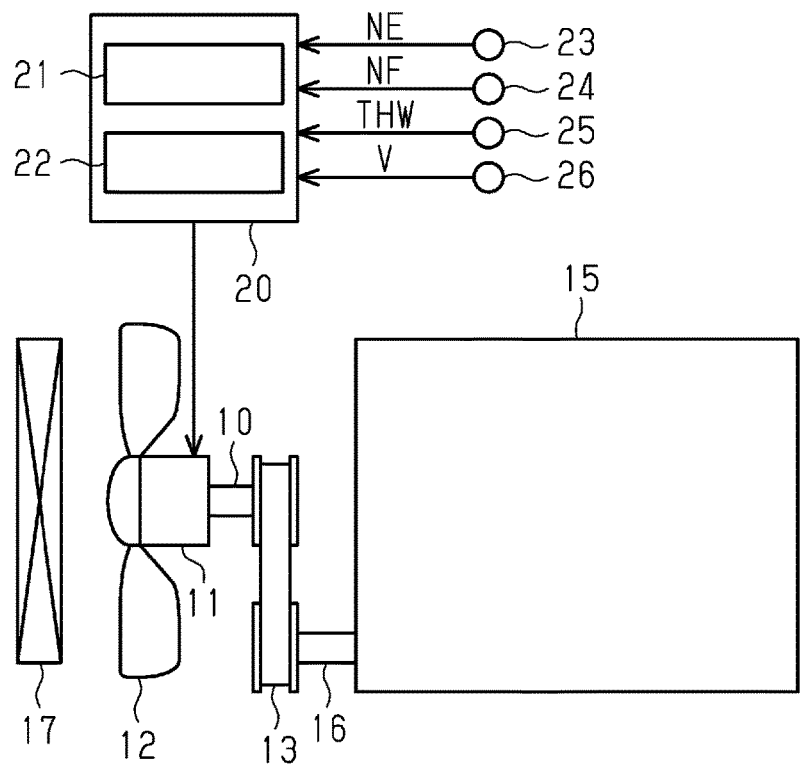
FIG. 1 is a diagram schematically showing a configuration of a cooling fan device according to an embodiment.

A cooling fan device according to one embodiment will be described with reference to FIGS. 1 to 3.

<Configuration of Cooling Fan Device>

First, the configuration of the cooling fan device according to the present embodiment will be described with reference to FIG. 1. The cooling fan device of the present embodiment is installed in an engine room of a vehicle. The cooling apparatus includes a rotation input shaft 10, a fan clutch 11, and a cooling fan 12. The rotation input shaft 10 is coupled to a crankshaft 16 of an engine 15 via a looped transmission mechanism 13. The cooling fan 12 generates cooling air for the radiator 17 in accordance with rotation. The radiator 17 is a heat exchanger for cooling engine coolant. The fan clutch 11 is interposed between the rotation input shaft 10 and the cooling fan 12. The fan clutch 11 is a fluid clutch that uses a viscous fluid such as silicone oil as a rotational torque transmission media. The fan clutch 11 is configured to change the engagement rate between the rotation input shaft 10 and the cooling fan 12 by adjusting the amount of the viscous fluid in the working chamber. The details of the fan clutch 11 are described in, for example, Japanese Laid-Open Patent Publication No. 2021-173382.

The cooling fan device includes an electronic control unit 20 as an electronic control unit. The electronic control unit 20 has a ROM 21 and a CPU 22. The ROM 21 is a storage device that stores programs and data for controlling the fan clutch 11. The CPU 22 is a processing device that reads and executes a program stored in the ROM 21. A first rotation speed sensor 23, a second rotation speed sensor 24, a coolant temperature sensor 25, a vehicle speed sensor 26, are connected to the electronic control unit 20. The first rotation speed sensor 23 is a sensor that detects an engine rotation speed NE that is a rotation speed of the crankshaft 16 of the engine 15. The second rotation speed sensor 24 is a sensor that detects a fan rotation speed NF that is a rotation speed of the cooling fan 12. The coolant temperature sensor 25 is a sensor that detects an engine coolant temperature THW, which is the temperature of the engine coolant. The vehicle speed sensor 26 is a sensor that detects a vehicle speed V.

The rotation input shaft 10 of the cooling fan apparatus configured as described above rotates at a speed proportional to the engine rotation speed NE. The rotation of the rotation input shaft 10 is transmitted to the cooling fan 12 via the fan clutch 11. In the following description, the rotation speed of the rotation input shaft 10 is referred to as an input rotation speed NI. The electronic control unit 20 calculates the input rotation speed NI based on the detection result of the first rotation speed sensor 23.

The electronic control unit 20 controls a fan engagement rate FN, which is an engagement rate between the rotation input shaft 10 and the cooling fan 12, through operation of the fan clutch 11. Here, the ratio of the fan rotation speed NF to the input rotation speed NI is used as the value of the fan engagement rate FN. When the value of the fan engagement rate FN is 0, the fan rotation speed NF is 0. When the value of the fan engagement rate FN is 1, the fan rotation speed NF is equal to the input rotation speed NI.

<Cooling Fan Control>

Next, cooling fan control executed by the electronic control unit 20 will be described with reference to FIG. 2. In the cooling fan control, the electronic control unit 20 sets a target engagement rate FN* which is a control target value of the fan engagement rate FN. Then, the electronic control unit 20 operates the fan clutch 11 so that the fan engagement rate FN becomes equal to the target engagement rate FN*. The fan clutch 11 is operated by open control or feedback control.

Figure 2:
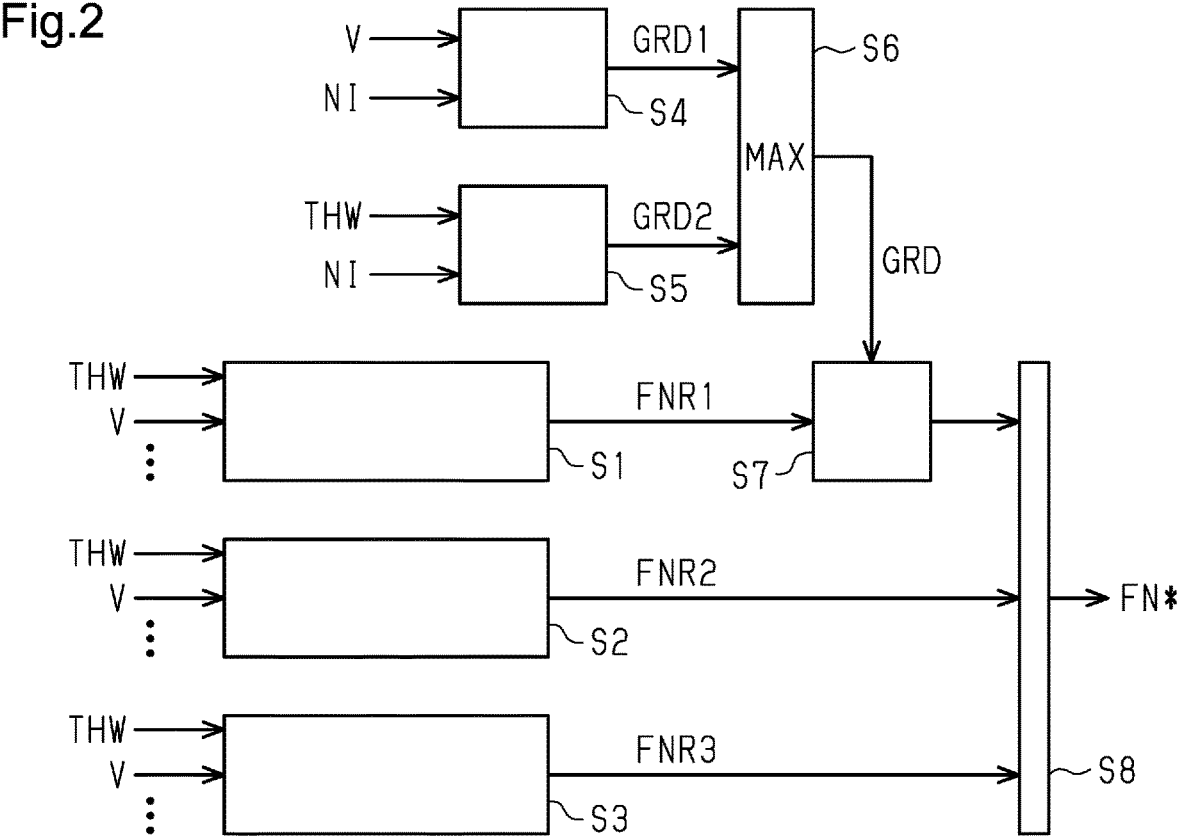
FIG. 2 is a control flow diagram showing a flow of processes related to control of a fan engagement rate executed by an electronic control unit of the cooling fan device.

FIG. 2 shows a flow of processing of the electronic control unit 20 related to setting of the target engagement rate FN*. The electronic control unit 20 repeatedly sets the target engagement rate FN* at specified control intervals.

When setting the target engagement rate FN*, the electronic control unit 20 calculates three values of a first coolant temperature requested engagement rate FNR1, a second coolant temperature requested engagement rate FNR2, and a third coolant temperature requested engagement rate FNR3 based on parameters such as the engine coolant temperature THW and the vehicle speed V (S1 to S3). The first coolant temperature requested engagement rate FNR1 is a requested value of the fan engagement rate FN assuming general traveling such as urban area traveling or high-speed traveling. The second coolant temperature requested engagement rate FNR2 is a requested value of the fan engagement rate FN assuming traveling with a relatively high load such as towing traveling or uphill traveling. The third coolant temperature requested engagement rate FNR3 is a requested value of the fan engagement rate FN on the assumption a very high load such as off-road traveling. The values of FNR1 to FNR3 are calculated such that the fan engagement rate FN becomes a value at which the air volume of the radiator 17 becomes an amount at which the engine coolant can be maintained at an appropriate temperature when the vehicle continues to travel while maintaining the current vehicle speed V under each assumed traveling condition.

On the other hand, the electronic control unit 20 calculates a first guard value GRD1 based on the vehicle speed V and the input rotation speed NI (S4). The electronic control unit 20 calculates a second guard value GRD2 based on the engine coolant temperature THW and the input rotation speed NI (S5).

The electronic control unit 20 calculates, as the value of the first guard value GRD1, a value having the following relationship with respect to the vehicle speed V and the input rotation speed NI. The fan rotation speed NF at which the fan noise becomes an allowable maximum value at the current vehicle speed V is referred to as a first upper limit rotation speed NF1. When the vehicle speed V is relatively high, the background noise is larger than when the vehicle speed V is relatively low, and thus the fan noise is less noticeable. Therefore, the first upper limit rotation speed NF1 is set to a lower speed when the vehicle speed V is relatively low than when the vehicle speed V is relatively high. The electronic control unit 20 calculates the value of the fan engagement rate FN at which the fan rotation speed NF becomes the first upper limit rotation speed NF1 at the current vehicle speed V and the input rotation speed NI as the value of the first guard value GRD1.

Figure 3:
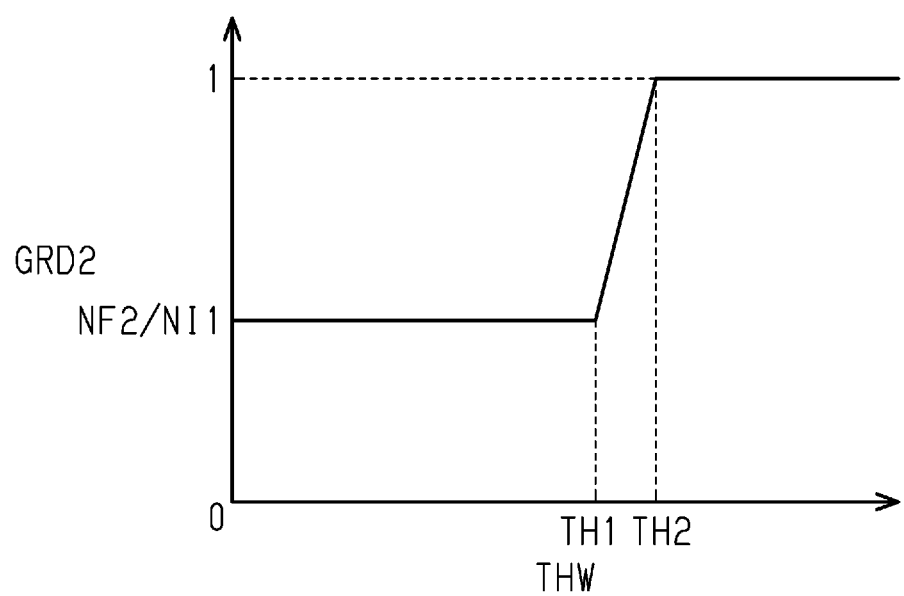
FIG. 3 is a graph showing a relationship between a second guard value and an engine coolant temperature.

FIG. 3 shows a manner in which the second guard value GRD2 is set. NI1 in the drawing indicates the present value of the input rotation speed NI, and TH2 indicates the maximum value of the appropriate temperature range of the engine coolant temperature THW. TH1 in the drawing is a constant, and is set to a temperature slightly lower than the TH2. Further, NF2 in the drawing indicates a second upper limit rotation speed which is the fan rotation speed NF at which the fan noise becomes the maximum value of the allowable range at the time of stop or at the time of low speed traveling.

The second guard value GRD2 in a case in which the engine coolant temperature THW is less than or equal to TH1 is set to a quotient (NF2/NI1) obtained by dividing the second upper limit rotation speed NF2 by NI1. That is, the second guard value GRD2 at this time is set to the fan engagement rate FN at which the fan rotation speed NF is the second upper limit rotation speed NF2. On the other hand, when the engine coolant temperature THW is greater than or equal to TH2, the second guard value GRD2 is set to 1. When the engine coolant temperature THW is in the range of TH1 to TH2, the second guard value GRD2 is set as follows. That is, the second guard value GRD2 at this time is set to a value that gradually increases as the engine coolant temperature THW increases from the value NF2/NI1 when the engine coolant temperature THW is TH1 to the value 1 when the engine coolant temperature THW is TH2.

In this way, when the engine coolant temperature THW is lower than TH1, the electronic control unit 20 calculates the fan engagement rate FN as the second guard value GRD2 such that the fan rotation speed NF is the second upper limit rotation speed NF2. When the engine coolant temperature THW is higher than TH1, the electronic control unit 20 calculates, as the second guard value GRD2, a fan engagement rate FN that causes the fan rotation speed NF to be higher than the second upper limit rotation speed NF2.

The electronic control unit 20 sets the upper limit guard value GRD to the larger one of the first guard value GRD1 and the second guard value GRD2 as (S6). Then, the electronic control unit 20 performs an upper limit guarding process for the value of the first coolant temperature requested engagement rate FNR1 so that the value of the first coolant temperature requested engagement rate SL becomes less than or equal to the upper limit guard value GRD (S7).

That is, when the first coolant temperature requested engagement rate FNR1 is less than or equal to the upper limit guard value GRD, the electronic control unit 20 maintains the value of the first coolant temperature requested engagement rate FNR1. On the other hand, when the first coolant temperature requested engagement rate FNR1 is larger than the upper limit guard value GRD, the electronic control unit 20 resets the first coolant temperature requested engagement rate FNR1 to the upper limit guard value GRD.

After the above-described processes, the electronic control unit 20 selects, as a value to which the target engagement rate FN* is set, a value corresponding to the current traveling state from the first coolant temperature requested engagement rate FNR1, the second coolant temperature requested engagement rate FNR2, and the third coolant temperature requested engagement rate FNR3 after being subjected to the upper limit guarding process (S8). In the case of this embodiment, the electronic control unit 20 performs the above-described selection based on the vehicle speed/intake air amount ratio. The vehicle speed/intake air amount ratio represents a ratio of the vehicle speed V to the moving average value of the intake air amount GA. When the vehicle speed/intake air amount ratio is less than or equal to a specified first determination value, the electronic control unit 20 selects, as the value to which the target engagement rate FN* is set, the value of the first coolant temperature requested engagement rate FNR1 after being subjected to the upper limit guarding process. When the vehicle speed/intake air amount ratio exceeds the first determination value and is less than or equal to a specified second determination value that is greater than the first determination value, the electronic control unit 20 selects the value of the second coolant temperature requested engagement rate FNR2 as the value to which the target engagement rate FN* is set. Further, when the vehicle speed/intake air amount ratio exceeds the second determination value, the electronic control unit 20 selects the value of the third coolant temperature requested engagement rate FNR3 as the value to which the target engagement rate FN* is set.

Operation and Advantages of Embodiment

The electronic control unit 20 calculates the first coolant temperature requested engagement rate FNR1, the second coolant temperature requested engagement rate FNR2, and the third coolant temperature requested engagement rate FNR3, which are requested values of the fan engagement rate FN corresponding to the cooling request of the engine coolant, in S1 to S3 of FIG. 2. In the present embodiment, the processes from S1 to S3 correspond to a first calculation process that calculates a coolant temperature requested engagement rate, which is a requested value of the fan engagement rate FN in accordance with the cooling request for the engine coolant.

Further, the electronic control unit 20 calculates the fan engagement rate FN at which the fan rotation speed NF becomes the first upper limit rotation speed NF1 as the first guard value GRD1 based on the vehicle speed V in S4 of FIG. 2. The first upper limit rotation speed NF1 is set to a lower speed when the vehicle speed V is relatively low than when the vehicle speed V is relatively high. In the present embodiment, the process of S4 corresponds to a second calculation process that calculates, as the first guard value GRD1, the fan engagement rate FN at which the fan rotation speed NF is the first upper limit rotation speed NF1.

Further, the electronic control unit 20 calculates the second guard value GRD2 based on the engine coolant temperature THW in S5 of FIG. 2. At this time, when the engine coolant temperature THW is lower than the specified temperature (TH1), the electronic control unit 20 calculates the fan engagement rate FN at which the fan rotation speed NF becomes the second upper limit rotation speed NF2 as the second guard value GRD2. When the engine coolant temperature THW is higher than the specified temperature (TH1), the electronic control unit 20 calculates the fan engagement rate FN at which the fan rotation speed NF is higher than the second upper limit rotation speed NF2 as the second guard value GRD2. In the present embodiment, the process of S5 corresponds to a third calculation process that calculates the second guard value GRD2 based on the engine coolant temperature THW.

Further, the electronic control unit 20 sets the upper limit guard value GRD to the larger one of the first guard value GRD1 and the second guard value GRD1 in S6 of FIG. 2. Then, the electronic control unit 20 performs the upper limit guard of the first coolant temperature requested engagement rate FNR1 so that the first coolant temperature requested engagement rate LA becomes a value less than or equal to the upper limit guard value GRD in S7 of FIG. 2. When the first guard value GRD1 is larger than the second guard value GRD2, the upper limit guard value GRD is set to the first guard value GRD1. Therefore, the process of S7 in this case is a process of setting the value of the first coolant temperature requested engagement rate FNR1 to the first guard value GRD1 when the calculated value of the first coolant temperature requested engagement rate FNR1 in S1 is larger than the first guard value GRD1. On the other hand, when the second guard value GRD2 is larger than the first guard value GRD1, the upper limit guard value GRD is set to the second guard value GRD2. Therefore, the process of S7 in this case is a process that sets the first coolant temperature requested engagement rate FNR1 to the second guard value GRD2 when the calculated value of the first coolant temperature requested engagement rate FNR1 in S1 exceeds the second guard value GRD2. In the present embodiment, the processes of S6 and S7 correspond to an upper limit guarding process.

The electronic control unit 20 calculates the first coolant temperature requested engagement rate FNR1 as a value to which the target engagement rate FN* is set when the vehicular traveling load is not relatively high. On the other hand, the electronic control unit 20 calculates a second coolant temperature requested engagement rate FNR2 and a third coolant temperature requested engagement rate FNR3 as values to which the target engagement rate FN* is set at the time of high-load traveling. The electronic control unit 20 subjects only the first coolant temperature requested engagement rate FNR1 to the upper limit guarding process in S7 of FIG. 2. Therefore, when the vehicle is in a high-load traveling state, the electronic control unit 20 controls the fan engagement rate FN based on the calculated value of the coolant temperature requested engagement rate in the first calculation process (S1 to S3) that has not subjected to the upper limit guarding process (S6, S7).

When the vehicle speed/intake air amount ratio, which is the ratio of the moving average of the intake air amount GA of the engine 15 to the vehicle speed V, is less than or equal to a specified first determination value, the electronic control unit 20 sets the target engagement rate FN* to the first coolant temperature requested engagement rate FNR1 that has been subjected to the upper limit guarding process. In contrast, when the vehicle speed/intake air amount ratio exceeds the first determination value, the electronic control unit 20 sets the value of the target engagement rate FN* to one of the second coolant temperature requested engagement rate FNR2 and the third coolant temperature requested engagement rate FNR3, which have not been subjected to the upper limit guarding process.

According to the cooling fan device of the present embodiment described above, the following effects can be obtained.

(1) The electronic control unit 20 executes the first calculation process (S1 to S3), the second calculation process (S4), and the upper limit guarding process (S6, S7) to control the fan engagement rate FN such that the fan rotation speed NF is less than or equal to the first upper limit rotation speed NF1. The first upper limit rotation speed NF1 is set to a lower speed when the vehicle speed V is relatively low and the background noise is relatively low than when the vehicle speed V is relatively high and the background noise is relatively loud. Therefore, it is possible to limit the fan noise so as to have a magnitude that is less noticeable with respect to the background noise that changes depending on the vehicle speed V. Therefore, deterioration of drivability due to fan noise is suppressed.

(2) The electronic control unit 20 performs the third calculation process (S5) and the upper limit guarding process (S6, S7). Thus, when the engine coolant temperature THW is lower than the specified temperature, the electronic control unit 20 controls the fan engagement rate FN such that the fan rotation speed NF is less than or equal to the second upper limit rotation speed NF2. When the engine coolant temperature THW is lower than the specified temperature, the electronic control unit 20 allows the fan rotation speed NF to exceed the second upper limit rotation speed NF2. Therefore, when the engine coolant temperature THW is not relatively high, the fan noise is suppressed, and when the engine coolant temperature THW is relatively high, the engine coolant can be quickly cooled.

(3) When the vehicle is in a high-load traveling state, the electronic control unit 20 does not subject the calculated value of the coolant temperature requested engagement rate to the upper limit guarding process (S6, S7). Therefore, during high-load running in which the amount of heat generated by the engine 15 increases and the engine coolant temperature THW is likely to rise, cooling of the engine coolant can be performed with priority over suppression of fan noise.

(4) When the ratio of the intake air amount GA of the engine 15 to the vehicle speed V exceeds a specified value, the electronic control unit 20 determines that the vehicle is in a high-load traveling state and determines whether or not the upper limit guarding process as described above needs to be executed. During high-load running, a larger drive torque is required for running than during low-load running. Therefore, the intake air amount GA of the engine 15 at the same vehicle speed V tends to be larger during the high-load running than during the low-load running. Therefore, based on the ratio of the intake air amount GA of the engine 15 to the vehicle speed V, it is possible to accurately determine whether or not the vehicle is traveling under a high load.

Other Embodiments

The present embodiment may be modified as follows. The present embodiment and the following modifications can be combined as long as the combined modifications remain technically consistent with each other.

Whether or not the vehicle is traveling under a high load may be determined in a manner different from the above-described embodiment. For example, whether or not the vehicle is traveling under a high load may be determined based on an integrated value of the intake air amount GA in a certain period.

The calculated value of the coolant temperature requested engagement rate may be subjected to the upper limit guarding process even when the vehicle is in a high-load traveling state. This can be realized by subjecting the calculated value of the second coolant temperature requested engagement rate FNR2 in S2 and the calculated value of the third coolant temperature requested engagement rate FNR3 in S3 to the process of S7 in FIG. 2.

In S4 of FIG. 2, the first guard value GRD1 may be calculated based on the vehicle speed V without using the input rotation speed NI. For example, during steady traveling of the vehicle, the engine rotation speed NE for each vehicle speed V falls within a certain range. Therefore, if the first guard value GRD1 is set to a smaller value when the vehicle speed V is relatively low than when the vehicle speed V is relatively high, the fan noise can be limited to a magnitude that does not become noise according to the background noise.

The processes S5 and S6 in FIG. 2 may be omitted, and the upper limit guard value GRD may be set to the first guard value GRD1 as it is to perform the process of S7. That is, the third calculation process may be omitted, and the upper limit guarding process may be performed based only on the first guard value GRD1 calculated in the second calculation process.

The target engagement rate FN* may be calculated as a value corresponding to a request other than the request for cooling the engine coolant, for example, a request for cooling an air conditioner coolant or a request for protection of a component of the cooling fan device. For example, a process of calculating a requested value of the fan engagement rate FN according to another request may be added to the series of processes in FIG. 2, and the target engagement rate FN* in S8 may be set based on the request value.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A cooling fan device configured to use a cooling fan coupled to an engine via a fan clutch to generate cooling air flow for a radiator, the cooling fan device comprising an electronic control unit configured to control an engagement rate of the fan clutch, wherein the electronic control unit is configured to execute:
a first calculation process that calculates a coolant temperature requested engagement rate, the coolant temperature requested engagement rate being a requested value of the engagement rate in accordance with a cooling request for the engine coolant;
a second calculation process that calculates, as a first guard value, a value of the engagement rate at which a rotation speed of the cooling fan is a first upper limit rotation speed based on a vehicle speed; and an upper limit guarding process that sets a value of the coolant temperature requested engagement rate to the first guard value when a calculated value of the coolant temperature requested engagement rate in the first calculation process exceeds the first guard value, thereby controlling the engagement rate based on a value of the coolant temperature requested engagement rate after being subjected to the upper limit guarding process, and the first upper limit rotation speed is set to a lower speed when the vehicle speed is relatively low than when the vehicle speed is relatively high.

2. The cooling fan device according to claim 1, wherein the electronic control unit is configured to execute a third calculation process that calculates a second guard value based on a temperature of the engine coolant, the upper limit guarding process includes setting the value of the coolant temperature requested engagement rate to the second guard value when the second guard value is smaller than the first guard value and the calculated value of the coolant temperature requested engagement rate in the first calculation process exceeds the second guard value, and the third calculation process includes calculating, as the value of the second guard value, a value of the engagement rate that sets a rotation speed of the cooling fan to a specified second upper limit rotation speed when the temperature of the engine coolant is lower than a specified temperature, and sets the rotation speed of the cooling fan to a speed higher than the specified second upper limit rotation speed when the temperature of the engine coolant is higher than the specified temperature.

3. The cooling fan device according to claim 1, wherein, when a vehicle is in a high-load traveling state, the electronic control unit controls the engagement rate based on the calculated value of the coolant temperature requested engagement rate in the first calculation process that has not been subjected to the upper limit guarding process.

4. The cooling fan device according to claim 3, wherein, when a ratio of an intake air amount of the engine to the vehicle speed exceeds a specified value, the cooling fan device determines that the vehicle is in the high-load traveling state.

* * * * *